UNITED STATES PATENT OFFICE.

ADOLF KAYSER, OF BUFFALO, NEW YORK, ASSIGNOR TO THE ELECTRIC SMELTING AND ALUMINUM COMPANY, OF LOCKPORT, NEW YORK.

DETERGENT COMPOUND.

No. 923,850.  Specification of Letters Patent.  Patented June 8, 1909.

Application filed September 26, 1905. Serial No. 280,228.

*To all whom it may concern:*

Be it known that I, ADOLF KAYSER, a citizen of the United States, residing at Buffalo, in the county of Erie and State of New York, have invented a new and useful Substance or Detergent Compound, of which the following is a specification.

My invention relates to detergents and the object of my invention is to produce at low cost an efficient cleansing agent.

I accomplish the object of my invention by combining into chemical union silica and alumina with alkali in such manner and proportion that the union results in the formation of a soluble sodium or potassium silico aluminate the solution of which possesses powerful detergent qualities and is capable of efficient detergent action. This substance or salt is represented by the formula $Al_2Si_3Na_8O_{13}$ which however is only the type (or one of many formulas which will produce this salt) as it may be modified and varied so as to produce a more silicious salt according to the uses and purposes for which the detergent is to be used and this too without in any way departing from the spirit of my invention and discovery, as, for instance, I find that a slight increase of silica is desirable when the detergent is used for domestic purposes, care should be taken, however, that the formula used does not contain an undue excess of silica and alumina, which would impair the hydration or the solubility of the salt, and thereby destroy its effectiveness. The salt may be prepared by the ignition of adequate raw materials or by treating them with a strong solution of caustic alkali at boiling temperature or under steam pressure. If the first method is carried out natural aluminum silicates may be blended, or mixed, in such a way as to correspond to the formula desired, taking care however that the percentage of iron in these materials does not reach above two per cent. These materials are then mixed with soda ash as indicated by the formula and when ignited in a suitable furnace the cinder obtained may be reduced to powder and is then ready for use. If the second method is adapted only hydrous raw materials can be used and the solvent used must be caustic alkali. While even very heavy caustic lye has but little effect on clays infusorial silica etc., when cold these substances are readily attacked at a higher temperature produced by direct application of heat or by adequate steam pressure.

The operation is directed in such a way that an aqueous sodium-silico aluminate with from 30 to 35% of water is obtained. It is then a viscid liquid ready for use. If, however, the liquid is left alone it will solidify in from two to ten days, according to the percentage of water it contains and the surrounding temperature. It becomes a syrupy liquid again upon being warmed. This last method I have frequently practiced, and in doing so, I have taken varying proportions, in one instance I made the new substance by emptying into a jacketed kettle provided with a stirring appliance, 400 pounds of commercial silicate of soda, and 300 pounds of 42° Baumé lye (liquid caustic soda), I then started the stirring mechanism and turned on the steam, thus raising the liquid to a boiling temperature, and after boiling for a few minutes, I added to the mixture, 75 pounds of commercial alumina (hydrate of alumina) and continued the boiling and stirring until the liquid became thicker and "creamy." The whole operation consumed about one hour.

I am aware that crystallization is accepted as evidence of a chemical combination and that this aqueous sodium-silico aluminate does not crystallize, for which reason, perhaps a positive proof of its being a chemical compound, cannot be given. Nor can this question be answered in the negative, considering that salts exist which do not crystallize, but must, notwithstanding, be pronounced to be chemical "compounds;" for instance, we accept the existence as a chemical compound of sodium aluminates, in which for one molecule of $Al_2O_3$, one or two and even three molecules of base ($Na_2O$) enter the combination. In like manner the proportions of this new substance may vary within certain limits and the elements still be regarded as having formed a chemical union and the substance be regarded as a chemical compound. It would also seem that, in this instance, the silica and alumina may be regarded as acids which have united with, and been satisfied with, the alkali, thereby forming a detergent salt which may properly be regarded as a mineral soap. This sodium-silico aluminate as an anhydrous salt absorbs water with great avidity and becomes the same viscid solution with 30 to 35% of water mentioned above, but if more water be added a sodium-silico aluminate less alkaline than the original will be precipitated and the solution will contain both alumina and silica in alkaline solution and be more alkaline than the precipitate. The precipitate will, in like manner, when again brought in contact with more water, give like reaction; although the resulting solution and precipitate will be weaker than those obtained from the former reactions, and this reaction may be continued until the whole precipitate is dissolved, thus proving that this mineral salt has the same, or parallel properties to fatty soaps which also split up into an alkaline and a more acid salt when being treated with water.

I am aware that soaps have been produced by incorporating into the soapstock percentages of silica and liquid glass and that Fuller's earth and clay have also been incorporated into soapstock, but, such mechanical use of these minerals, either singly or together does not accomplish the results which I accomplish or produce the chemical compound which I produce by combining them chemically with alkali which is the subject of my invention and which I produce by chemical union as will be readily seen from the mode of its production.

What I claim, therefore, and desire to secure by Letters Patent of the United States, is:

1. In detergents a composition of matter formed of one molecular weight of alumina, two to eight molecular weights of silica, and four to six molecular weights of alkali metal oxid substantially as and for the purpose set forth.

2. In detergents a composition of matter in a hydrated condition formed of one molecular weight of alumina two to eight molecular weights of silica and four to six molecular weights of alkali metal oxid substantially as and for the purpose set forth.

3. In detergents a composition of matter formed of one molecular weight of alumina two to eight molecular weights of silica and four to six molecular weights of sodium oxid ($Na_2O$) in a hydrated condition substantially as and for the purpose set forth.

4. The herein described composition of matter formed from the chemical union in the multiple molecular proportions of $Al_2$, $Si_3$, $Na_8$, and $O_{13}$.

ADOLF KAYSER.

Witnesses:
J. L. SNYDER,
F. T. BLOOMER.